United States Patent [19]
Adams

[11] Patent Number: 4,977,342
[45] Date of Patent: Dec. 11, 1990

[54] ELECTROMAGNETIC VIBRATION GENERATORS

[75] Inventor: Anthony B. Adams, Litlington Nr. Royston, England

[73] Assignee: Ling Dynamic Systems Limited, Royston, England

[21] Appl. No.: 339,028

[22] Filed: Apr. 17, 1989

[30] Foreign Application Priority Data

Apr. 20, 1988 [GB] United Kingdom ............... 8809289

[51] Int. Cl.⁵ ............................................. H02K 33/00
[52] U.S. Cl. ........................................ 310/20; 310/17
[58] Field of Search ................ 310/15, 17, 20, 81, 310/91

[56] References Cited
FOREIGN PATENT DOCUMENTS
1449014 9/1976 United Kingdom .

Primary Examiner—Steven L. Stephan
Assistant Examiner—Judson H. Jones
Attorney, Agent, or Firm—Biebel, French & Nauman

[57] ABSTRACT

An electromagnetic vibration generator or shaker comprises an armature suspended from a stator and having a coil carried by the armature located in an air gap in the stator. A D.C. magnetic field is produced across the air gap and when an alternating current is fed through the armature coil the armature virbrates along its longitudinal axis. According to the invention the armature is suspended at its periphery by a plurality of suspension members which are arranged in pairs and allow free movement of the armature along its axis of vibration. However the two members of each pair are arranged at an angle to each other and exhibit a stiffness to lateral movement of the armature so as to restrain turning forces acting on the armature in either direction of rotation.

9 Claims, 2 Drawing Sheets

ELECTROMAGNETIC VIBRATION GENERATORS

BACKGROUND OF THE INVENTION

The present invention relates to electromagnetic vibration generators, sometimes known in the art as shakers, which are employed for the vibration testing of components, apparatus and equipment in numerous branches of industry and research.

Such electromagnetic vibration generators basically consist of an armature which is suspended from a rigid body or stator and having a coil carried by the armature located in an air gap in the stator. A D.C. magnetic field is generated across the air gap either by permanent magnets or electromagnets and when an alternating current is fed through the armature coil, the armature is caused to vibrate along its axis at the frequency of the applied alternating current. The armature is mounted on bearings and has peripheral suspension members which center the armature in the air gap and allow free movement along its axis of vibration but which impose a high stiffness to any lateral movement of the armature normal to its axis of vibration. An article to be vibration tested may be placed directly on top of the armature or on a work table carried by the armature when the vibration testing is to be carried out in the vertical mode, or the article to be tested may be placed on a horizontal slip table coupled to the armature when the vibration testing is to be carried out in the horizontal mode, as is well known in the art.

Although as mentioned above, armature suspension systems are designed to provide a high degree of stiffness to any lateral movement of the armature, existing systems do not necessarily provide a high restraint to torsional forces tending to cause turning movement of the armature about its axis of vibration. Such torsional forces may be induced partly due to the helical form of the armature coil and/or by resonances induced in the armature in relation to its suspension system at one or more particular frequencies throughout the range of frequencies employed for the vibration testing. This can in turn give rise to problems during the vibration testing of certain types of components, such as gyroscopes, which are sensitive to spurious rotational forces or movements.

SUMMARY OF THE INVENTION

It is accordingly an object of the present invention to provide an electromagnetic vibration generator having an armature suspension system which inherently resists and restrains any torsional movement of the armature throughout its range of vibration.

According to the present invention the armature suspension members, which allow free movement of the armature along its axis of vibration but which exhibit a stiffness to lateral movement of the armature, are arranged in pairs with the two members of a pair at an angle to each other about the periphery of the armature and the stiffness of one suspension member of each pair is employed to restrain turning forces acting on the armature in one direction of rotation whilst the stiffness of the other suspension member of each pair is employed to restrain turning forces acting on the armature in the opposite direction of rotation.

The invention also provides an electromagnetic vibration generator in which the armature for transmitting the vibrations generated to an article to be tested is suspended at its periphery by a plurality of suspension members which are arranged in pairs and allow free movement of the armature along its axis of vibration, the two members of each pair being arranged at an angle to each other and so disposed that any torsional force generated in the armature which attempts to cause turning of the armature about its axis of vibration exerts a compressive force on one suspension member of each pair for one direction of said torsional force and a compressive force on the other suspension member of each pair for the opposite direction of said torsional force, said compressive force being exerted on said suspension members in a stiffness direction of said members.

The armature is generally of circular or cylindrical form and the number of pairs of suspension members arranged about the periphery of the armature must be at least three and is preferably four or five. However a higher number of pairs of suspension members may be necessary on large vibration generators.

The angle between the two suspension members of a pair is not critical provided that the desired effect is obtained of the suspension members restraining turning forces on the armature. This angle will depend to some extent on the number of pairs of suspension members and the nature of the suspension members employed.

In one preferred embodiment the angle between the two suspension members of a pair is approximately a right angle. Whatever the angle, the two suspension members of a pair are arranged so that the angle between them is bisected by a radius extending from the axis of vibration of the armature.

The suspension member may be of any design which allows free movement of the armature along its axis of vibration but which presents a high stiffness to compressive forces applied to the suspension member as a result of torsion of the armature. By way of example, the suspension members may comprise pivoted struts, flexures, which may be laminated, rotatable bushes or bearings; or a combination of any of such devices.

BRIEF DESCRIPTION OF THE DRAWINGS

The invention will now be further described, by way of example, with reference to the accompanying drawings, in which.

DESCRIPTION OF THE PREFERRED EMBODIMENT

Figure 2:
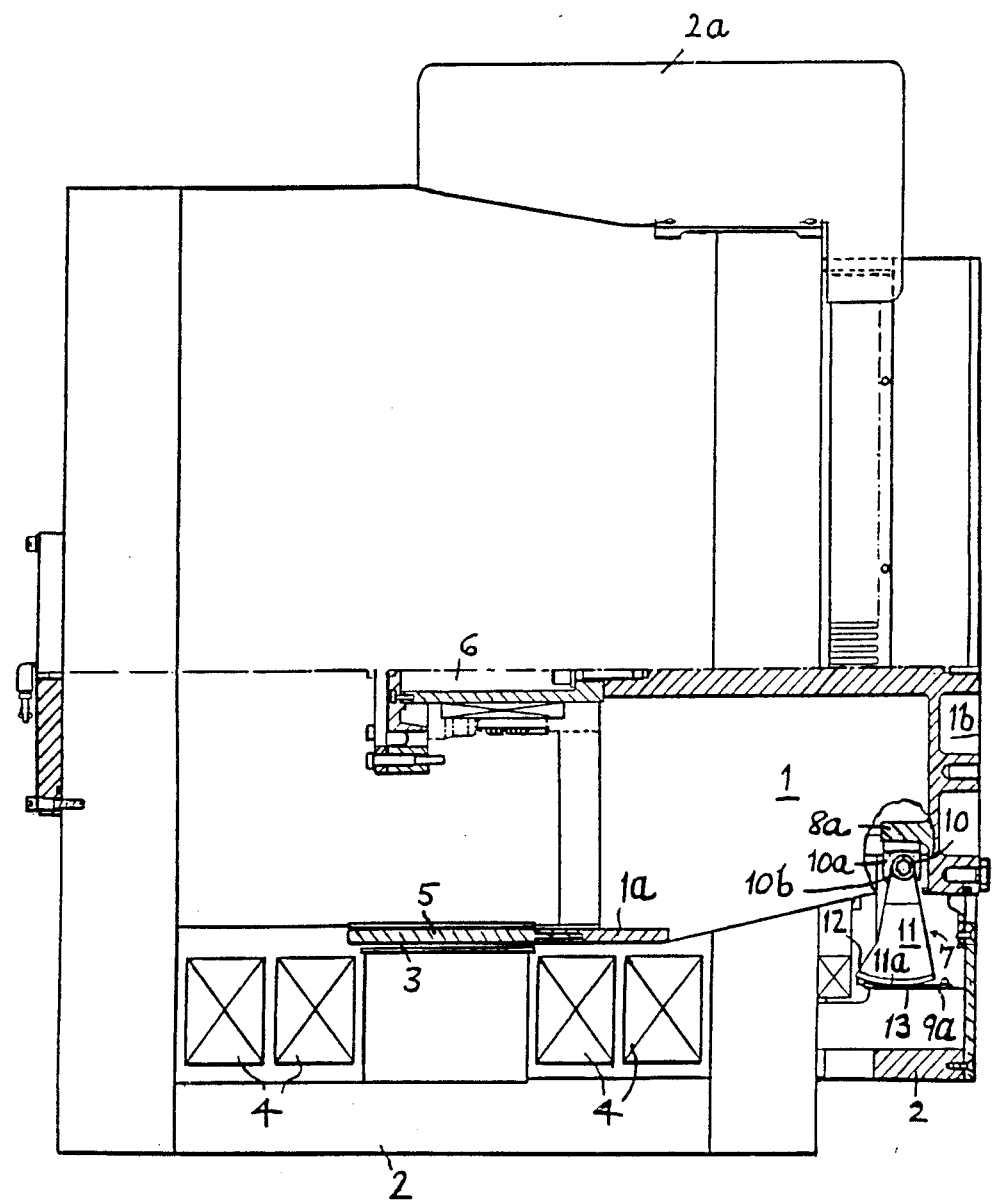
FIG. 2 is a part sectional view along the line II—II in FIG. 1.

Referring to the drawings, the electromagnetic vibration generator illustrated comprises an armature 1 mounted for vibratory movement relative to a rigid stator or body 2. The latter is provided with trunnions 2a by which it is supported in a rigid frame (not shown) so that the vibration generator can be oriented either for vibration along a vertical axis or along a horizontal axis. As seen in FIG. 2, the body is provided with an annular air gap 3 across which is produced a D.C. magnetic field generated by the coils 4 and within which is located a coil 5 attached to the lower end 1a of the armature structure. Energisation of the armature coil 5 by an alternating current causes the armature 1 to vibrate, relative to the body 2, along its longitudinal axis at the frequency of the alternating current applied to the coil 5. The armature 1 is mounted on an axially located bearing 6, for example a hydrostatic bearing, which allows free movement of the armature along its vibratory axis but which restrains lateral movement of the armature. The periphery of the armature 1 is supported from the body 2 by suspension members, generally indicated at 7, which serve to center the armature coil 5 in the air gap 3 and which also allow free movement of the armature along its axis of vibration but have a high stiffness to any lateral movement of the armature.

The present invention provides a suspension arrangement which also affords a high restraint to any torsional forces acting on the armature 1 and tending to turn it about its axis of rotation. Such forces may, for example, be generated by resonances induced in the armature at certain frequencies of vibration or by the helical form of the armature coil 5. To this end the suspension members 7 are arranged in pairs 7a, 7b at an angle to each other and at such an attitude to the armature that any torsional force generated which attempts to rotate the armature in one direction is highly restrained by that force attempting to compress a component of the suspension members 7a in a direction where that component exhibits a high stiffness whilst, similarly, any torsional force generated which attempts to rotate the armature in the opposite direction likewise is restrained by the high stiffness of the corresponding component of the suspension members 7b. As illustrated the two suspension members 7a, 7b of a pair are disposed at right angles to each other and this angle is bisected by a radius from the axis of rotation of the armature.

Figure 1:
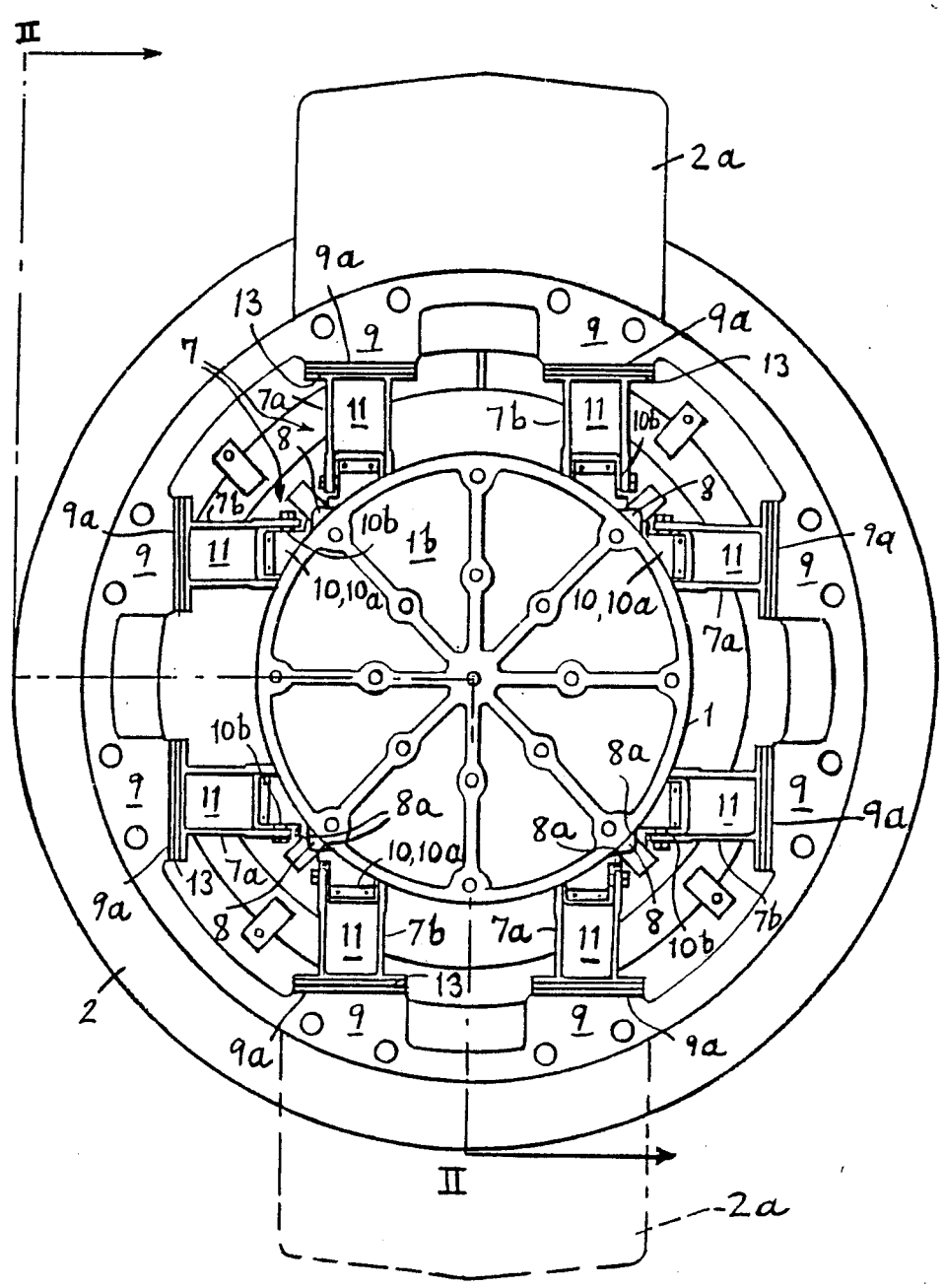
FIG. 1 is a view from the armature end of one embodiment of electromagnetic vibration generator according to the invention.

The construction and arrangement of the suspension members employed in this embodiment will now be described in greater detail. As can be seen from FIG. 1, four pairs of suspension members are equally spaced around the periphery of the armature 1 and are located adjacent the upper face 1b of the armature, which forms a working platform to which an article to be vibration tested may be secured, e.g. by bolts. The armature structure is formed as a metal casting and is provided with four projections 8, each having two adjacent faces 8a at right angles, equally spaced around its periphery. The body 2 is likewise provided with projections 9 having faces 9a disposed such that a face 9a on the body 2 is opposite each face 8a on the armature 1. Each suspension member is of the so-called rolling strut type and comprises a rubber to metal bushing 10 having its outer shell 10a secured to a face 8a and its inner axial bearing 10b connected to one end of a strut 11. The other end of the strut is formed as an arcuate surface 11a which has one edge secured at 12 to one end of a flexure member 13 which is attached at its other end to the associated face 9a on the stator 2. As will be apparent, axial movement of the armature 1 will cause the arcuate surface 11a of the strut 11 to roll over the adjacent surface of the flexure member 13 whilst the other end of the strut 11 pivots due to the flexing of the rubber bush bonded between the axial bearing 10b and outer shell 10a. However the suspension structures are stiff so far as lateral movement of the armature is concerned and also offer a high restraint to any torsional forces acting on the armature since such forces act in compression on the high stiffness direction of components of the suspension structures. One suspension member of each pair acts to restrain torsional forces acting in one direction, whilst the other suspension member of each pair acts to restrain torsional forces acting in the opposite direction.

It will be understood that the embodiment described is by way of illustration only and that numerous variations may be made to the form, arrangement, and disposition of the suspension members depending on the overall design of the vibration generator. In one particular alternative arrangement each suspension member may comprise a roller member having two oppositely directed arcuate faces which are respectively secured to one end of two flexure members having their opposite ends respectively secured to the associated opposed faces 8a and 9a.

I claim:

1. An electromagnetic vibration generator comprising an armature suspended by suspension members from a stator and having a coil carried by the armature located in an air gap in the stator, wherein the armature suspension members allow free movement of the armature along its axis of vibration but exhibit a stiffness to lateral movement of the armature and said suspension members are arranged in pairs about the periphery of the armature with the two members of a pair at an angle to each other and the stiffness of one suspension member of each pair restrains turning forces acting on the armature in one direction of rotation whilst the stiffness of the other suspension member of each pair restrains turning forces acting on the armature in the opposite direction of rotation and in which the two suspension members of each pair are so disposed that any torsional force generated in the armature which attempts to cause turning of the armature about its axis of vibration exerts a compressive force on one suspension member of each pair for one direction of said torsional force and a compressive force on the other suspension member of each pair for the opposite direction of said torsional force, said compressive force being exerted on said suspension members in a stiffness direction of said members.

2. An electromagnetic vibration generator as claimed in claim 1, in which at least four pairs of suspension members are arranged about the periphery of the armature.

3. An electromagnetic vibration generator as claimed in claim 1, in which the angle between the two suspension members of a pair is approximately a right angle.

4. An electromagnetic vibration generator as claimed in claim 1, in which the angle between the two suspension members of a pair is bisected by a radius extending from the axis of vibration of the armature.

5. An electromagnetic vibration generator as claimed in claim 1, in which each suspension member comprises a pivoted strut.

6. An electromagnetic vibration generator as claimed in claim 5, in which one end of said strut is pivoted by a bushing.

7. An electromagnetic vibration generator as claimed in claim 6, in which the bushing is a rubber to metal bushing having its outer shell secured relative to the armature and its inner axial bearing secured to said strut.

8. An electromagnetic vibration generator as claimed in claim 5, in which one end of said strut is formed as an arcuate surface having an edge secured to one end of a flexure member.

9. An electromagnetic vibration generator as claimed in claim 8, in which the other end of said flexure member is secured to said stator.

* * * * *